United States Patent Office 3,555,419
Patented Jan. 12, 1971

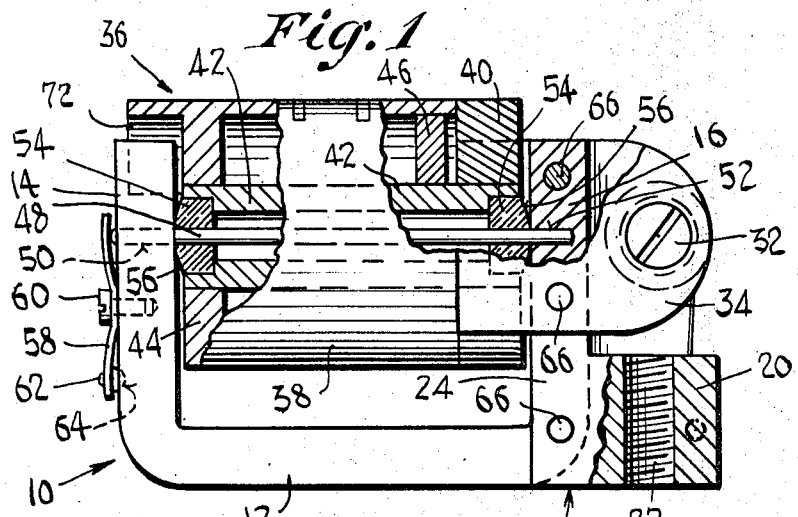
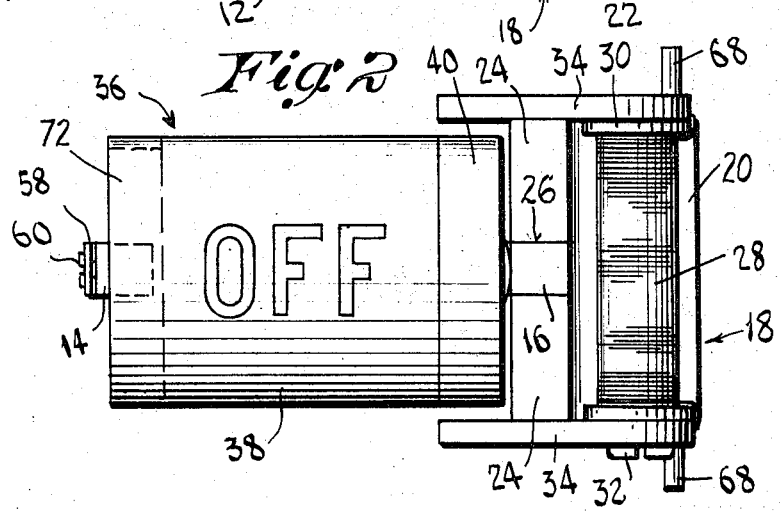
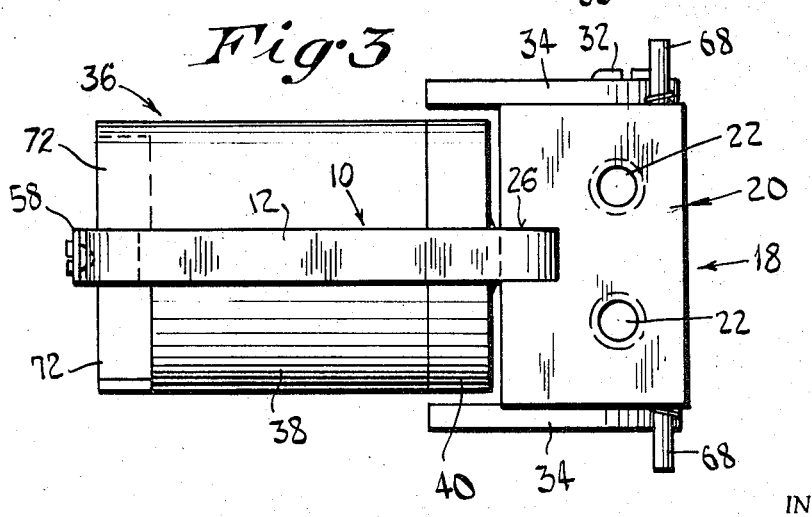

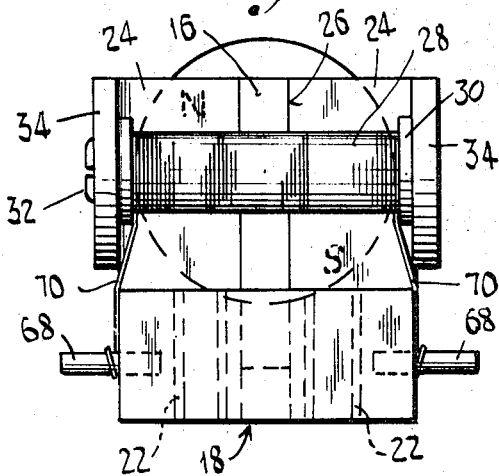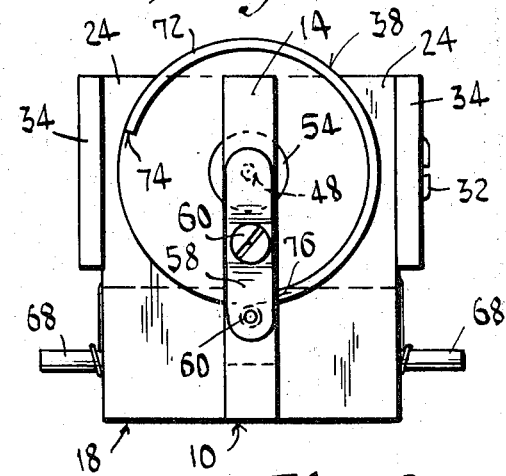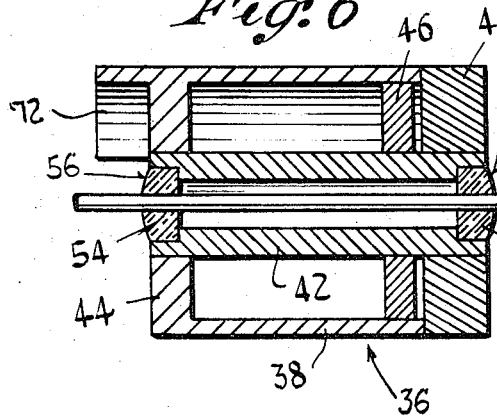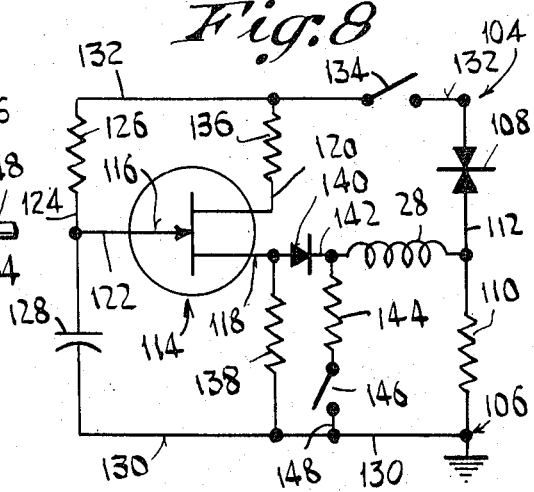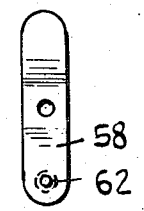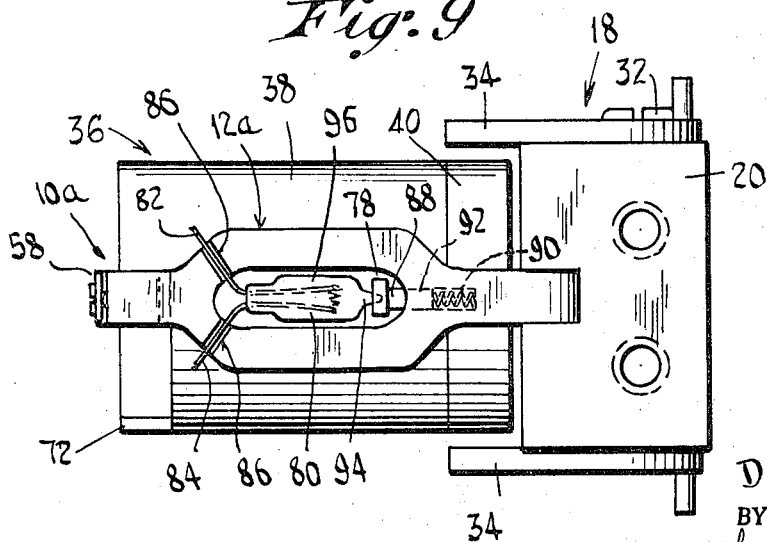

3,555,419
MAGNETICALLY OPERATED INDICATOR WITH U-SHAPED BEARING FRAME
Dana J. Blackwell, Naugatuck, Conn., assignor to Lewis Engineering Company, Naugatuck, Conn., a corporation of Connecticut
Filed Dec. 2, 1968, Ser. No. 780,438
Int. Cl. G01r 1/02
U.S. Cl. 324—146                                                    9 Claims

ABSTRACT OF THE DISCLOSURE

An electrically-operated "On-Off" indicator comprising an electromagnet having between its poles a rotatable permanent magnet connected to an indicia-carrying rotary drum. The permanent magnet and drum are on a central bushing carrying bearings through which a shaft extends. The ends of the shaft are disposed in aligned holes in the legs of a U-shaped integral frame between which the drum and magnet are located. The frame and the electromagnet are clamped to a plastic mounting block which, in conjunction with the U-frame, make for an exceptionally sturdy and shock-resistant instrument.

BACKGROUND

This invention relates to electrically-operated indicator devices of the type having a rotary indicia-carrying drum intended to turn so as to present different faces at a viewing window or area.

Prior indicator devices of this type, being of very small size and mass, have relied largely on this physical characteristic to enable them to resist shock, vibration and other physical abuse. The construction of these prior devices has accordingly not been directed to absolute reliability and ruggedness from the physical standpoint. In consequence, failures and malfunctioning have sometimes occurred, even in environments considered to be of a generally favorable nature.

SUMMARY

The above drawbacks and disadvantages of prior rotary-drum type indicators are obviated by the present invention, one object being to provide an improved instrument of the kind indicated, which is particularly sturdy and rugged in its construction whereby it successfully withstands considerable shock, vibration, rough handling and conditions of use generally considered adverse to instrumentation, all to the end that extreme reliability of operation is had over an extended period of use.

Other objects and advantages reside in an improved drum-type indicator as above set forth, which is especially simple and economical in its construction, involving low cost components and assemblages; an improved indicator of high efficiency and sensitivity whereby small currents will operate it; and an indicator in accordance with the foregoing, which may be easily dismantled for adjustment and servicing procedures.

Other features and advantages will hereinafter appear.

In the drawings:

FIG. 1 is a view partly in side elevation and partly in axial section, of an improved indicator made in accordance with the invention.

FIG. 2 is a top plan view of the indicator of FIG. 1.
FIG. 3 is a bottom plan view of the indicator of FIG. 1.
FIG. 4 is a rear elevational view of the indicator of FIG. 1.
FIG. 5 is a front elevational view of the indicator.
FIG. 6 is an axial sectional view of the drum and permanent magnet assemblage of the indicator.

FIG. 7 is a detail of a stop strip for the shaft of the indicator.

FIG. 8 is a schematic circuit diagram of a time delay circuit for use with the indicator.

FIG. 9 is a fragmentary bottom plan view of an indicator constituting a modification of the invention wherein a lighting device is incorporated in the bearing frame.

As shown, the present indicator device comprises in accordance with this invention an integral U-shaped frame member 10 having a horizontal yoke portion 12 and a pair of parallel, upstanding leg portions 14 and 16. Supporting the U-shaped frame 10 is a mounting block or base member 18 of L-shaped configuration, having a base portion 20 provided with mounting holes 22, and having a bifurcated upstanding portion 24 containing a slot 26 in which is disposed and secured the leg 16 of the frame 10.

Also attached to the upstanding bifurcated portion 24 is an electro-magnet assembly comprising an energizing coil 28 wound on a nylon bobbin 30 through which there passes a magnetic core member in the form of an iron or steel bolt 32. The bolt 32 secures to the coil 28 and end portions of the bobbin 30 a pair of spaced flat magnet pole pieces 34 which extend along opposite side surfaces of the mounting base 18 and past the same in a direction toward the frame leg 14.

Disposed in the area bounded by the frame legs 14, 16 and the pole pieces 34 is an indicator drum and permanent magnet assemblage 36, comprising an indicia-carrying drum 38 against one end of which there is coaxially arranged a ring-shaped permanent magnet 40. The drum 38 and magnet 40 are carried on a central bushing 42 which snugly fits in the bore of the magnet 40 and in the bore of a transverse integral end wall 44 of the drum 38, located at that end which is remote from the magnet. A spacer ring 46 is closely fitted in the other end of the drum 38 adjacent the magnet 40, having a snug fit with the interior of the drum and with the exterior of the bushing 42.

For the purpose of rotatably mounting the drum and magnet assemblage 36 in the frame 10, a shaft or spindle 48 is provided, disposed in aligned mounting holes 50, 52 located respectively in the legs 14, 16. The holes 50, 52 are spaced inward or downward from the extremities of the legs as seen in FIG. 1. Fitted in the ends of the bushing 42 are bearing members 54 which may comprise jewels, having crowned ends 56 engaged with the inner, facing surfaces of the frame legs 14, 16 and constituting end stops to take up any excessive end play of the drum assemblage. The jewel bearings 54 may be press-fitted or cemented in the bushing 42. Also, the drum wall 44, spacer ring 46 and magnet 40 may likewise be press-fitted to the bushing 42 or cemented to the same, or both. In a circumstance where the magnet 40 is to be cemented to the bearing bushing 42 it is not necessary to have critical dimensions for the bore of the magnet. Thus, sintered metal or ceramic material may be readily used, as will be understood.

The shaft 48 is loose in the holes 50, 52 in order to enable it to be easily and quickly removed in the event that the drum assemblage is to be taken out. Retention of the shaft 42 is effected by a spring-metal finger 58 which is pivotally mounted on the frame leg 14 by means of a screw 60, such finger having at its lower extremity a detent rivet 62 adapted to be received in a small recess 64 in the exterior surface of the leg whereby a yieldable action is had to enable the finger to be swung edgewise.

The U-frame 10 and the bushing 42 may be advantageously constituted of the same metal, as for example aluminum, whereby they have the same coefficient of expansion. Thus, temperature changes will not be likely to adversely affect the dimensions in such a manner as to cause binding or excessive looseness of the drum assembly 36 in the frame 10.

Securement of the frame 10 in the mounting block 18 is accomplished by fastening pins 66 two of which also go through the pole pieces 34 of the electromagnet, being of non-magnetic material such as brass or aluminum.

The mounting block 18 has terminal pins 68 fitted into its opposite sides as seen in FIG. 4, to which the lead wires 70 from the magnet coil 28 are attached for the purpose of making connections thereto.

The poles of the permanent magnet 40 may be oppositely disposed, and located as indicated in FIG. 4 with respect to stops (described below) which are provided on the drum 38.

In accordance with this invention, the drum 38 is molded of plastic and provided with an integral partially-circular end flange 72 having end surfaces or edges 74, 76 as shown in FIG. 5 arranged for engagement with the frame leg 14. The flange 72 thus restricts the turning movement of the drum assemblage 36 to slightly more than 90°. Thus the north magnet pole shown in FIG. 4 may travel from left to right through such an arc, to an opposite position with respect to the vertical plane of the instrument through the frame legs 14, 16, and the south magnet pole may travel from right to left through a similar arc of slightly more than 90°.

It will be understood that by polarizing the electromagnet in one direction or the other, as by reversing the current through the coil 28, the drum assemblage 36 may be made to turn through its arc of travel, as permitted by the end stops on the flange 72 of the drum.

A modification of the invention is illustrated in FIG. 9 wherein the U-shaped frame member carries a lamp for illuminating the drum assemblage. In this figure, similar components have been given like characters. The frame member in FIG. 9 is designated 10a, and comprises a yoke portion 12a provided with an elongate opening 78 in which there is accommodated an incandescent lamp 80. Leads 82, 84 from the lamp 80 are brought out through notches 86 in the yoke portion 12a, and suitable cement or other fastening means may be provided to insulatedly secure the leads against movement. A spring-urged plunger 88 carried by the frame yoke 12a and biased by a coil spring 90 located in a bore 92 of the frame has a socket for receiving the tip portion 94 of the lamp 80, thereby to support the lamp against looseness. As shown, the yoke portion 12a of the frame 10a is widened to provide for the elongate lamp opening (labelled 96). Sufficient strength and rigidity is retained thereby.

The lamp 80 may be of sub-miniature size, often referred to as a "kernel of wheat" lamp whereby its mass is especially small with respect to the strength of the lead wires 82, 84. Thus, adequate support is had for the lamp by such wires in conjunction with the spring-urged plunger 88.

The indicator device as above described may be advantageously used with a time-delay circuit such as that shown in FIG. 8 and described in U.S. Pat. 3,185,979. This time delay circuit involves relatively few components which are especially small and rugged whereby the circuitry is compact and requires but little space while at the same time being resistant to vibration, shock etc.

Referring to the figure, terminals 104 and 106 are provided in connection to a suitable source of energy having a potential, for example, of from 36 to 48 volts D.C. Connected between the terminals 104 and 106 and in series with each other are a 24 volt Zener diode 108 and a resistor 110. These two components are joined by a wire 112.

The circuit further utilizes a double base diode or unijunction transistor 114 having an emitter 116, a number 1 base connection 118 and a number 2 base connection 120. The emitter 116 is connected by a wire 122 to the joining wire 124 between a resistor 126 and a capacitor 128, the latter having the polarity indicated. The capacitor 128 is connected by a wire 130 to the terminal 106, and the resistor 126 is connected by a wire 132 through a control switch 134 to the terminal 104. The base number 2 connection 120 is joined to a resistor 136 which is in turn connected with the wire 132. The base number 1 connection which is labelled 118 is connected through a resistor 138 to the wire 130. The base connection 118 is also connected to a diode 140 which is in turn connected to one end of the energizable coil 28 of the unit shown in FIG. 4. The remaining end of the coil 28 is connected by a wire 142 to the wire 112. A resistor 144 is connected with the wire 142 and with a reset switch 146 which is in turn connected by a wire 148 to the wire 130. This completes the time delay current as utilized with the indicator unit of FIG. 4.

In the above circuit, the components may have the following values: The resistor 136 may be 470 ohms, the resistor 126 may be 10,000 ohms. The coil 280 may be 6,800 ohms, the resistor 144 may be 18 ohms, and the resistor 110 may be 1,000 ohms. The coil 28 may have a resistance of 800 ohms, and the capacitor 128 may have a value of 22 microfarads. The uni-junction transistor may be of the kind commercially available under the number 2N491, and the Zener diode 108 may be type 1N1881.

The control switch 134 may be associated with an operating instrumentality and caused to close in response to the attainment of a certain temperature by the said instrumentality. With the circuit shown, a delay of approximately 3 seconds is introduced between the moment of closing of the control switch 134 and the energization of the indicator coil 28 to an extent sufficient to shift the drum from the "off" position shown in FIG. 2, to the "on" position described.

Operation of the circuit of FIG. 8 is briefly as follows: With the control switch 134 in the open position as shown, the existence of the indicated voltage between the terminals 104 and 106 will not result in any appreciable current flow for the reason that insufficient voltage will be applied between the opposite terminals of the Zener diode 108 to break down the same or cause it to become conductive. The presence of the high value resistors 110 and 138 will not provide sufficient conductivity to attain a breakdown of the Zener diode 108, as will be understood. And, of course, no appreciable current path will be provided through the capacitor 128 for this purpose. The drum will be displaying the word "off."

If now the switch 134 should be closed, a charging of the capacitor 128 through the resistor 126 will occur. Due to the relatively high value of the resistor 126, there will be required a certain interval of time until the capacitor 128 attains a charge sufficient to cause the transistor 114 to become conductive or operative. After the said elapse of time, whereupon the potential difference between the terminals of the capacitor 128 attains a value sufficient to cause the transistor 114 to become operative, a low resistance path will be established through said transistor between the emitter 122 connection and the connection 118 of the base number 1. The condenser 128 will now discharge through the said low resistance path, the discharge current passing through the diode 140 and through the coil 28 and resistor 110. Energization of the coil 28 will effect a north polarity at the pole plate 33 and a south polarity at the pole plate 34. The resultant repulsion and attraction between the said pole plates on the one hand and the permanent magnet poles of the indicator drum on the other hand will shift the indicator drum from the "off" position shown to the "on" position, wherein the drum will now remain even when the pulse or current ceases. The discharge from the capacitor 128 will be in the nature of a pulse. However, the said pulse will provide sufficient current to effect the operation of the indicator as just set forth.

With the switch 134 remaining closed, the said pulse or charging and discharging cycle will be repeated, the capacitor 128 periodically charging and thereafter discharging through the transistor 114, diode 140 and indicator coil 28. However, all subsequent pulses from the capacitor 128 will have no motivating effect on the indicator drum once the drum has been shifted from the "off" position to the "on" position. Also, if at any time the switch 134 will be opened, this will not restore the indicator drum to the "off" position, since such restoration requires an opposite energization of the indicator coil 28. In effecting the reset of the indicator, the switch 134 is now placed in the open position, as shown in FIG. 8.

Such opposite energization is effected in a simple and unique manner by the provision of the illustrated circuit, being accomplished by merely closing the reset switch 146. When such switch is closed after the indicator has been shifted from the "off" to the "on" position, the following action will take place: The relatively small resistance of the resistor 144 and coil 28 now functioning in parallel with the resistor 110, will result in the application of a voltage to the Zener diode 108 in excess of the break-down voltage thereof. In consequence, the Zener diode 108 will become conducting, and current will flow through the same and through the coil 28 in a direction opposite to that which flowed previously as a consequence of discharge of the capacitor 128. Such opposite current flowing through the coil 28 will effect an opposite polarity of the pole plates 33 and 24, as compared with the polarity produced in consequence of discharging of the capacitor 128. Therefore, the resultant magnetic repulsion and retraction will now restore or shift the indicator drum in a counterclockwise direction, to the position illustrated in FIG. 4. When this has occurred, the reset switch 146 is again placed in the open position as shown, and the device is in readiness for providing a new indication approximately three seconds after the control switch 134 is closed.

It will now be seen from the foregoing that I have provided a novel and improved indicator device which, by virtue of the one-piece frame 10, mounting block 18, arrangement of the electro-magnet structure, and also arrangement of the indicator drum structure is extremely sturdy and rugged, being resistant to shock and vibration. Moreover, relatively simple components are involved in the construction, and the necessity for critical tolerances is avoided. Changes in temperature will have relatively no effect on the reliability and operation of the indicator, and a simple and reliable yet easily removable support is had for the indicia carrying drum 38 and the permanent magnet 40. The various parts are securely assembled by means of the three fastening pins 66, yet the drum assemblage may be easily and quickly removed for servicing or replacement by merely shifting the spring retainer strip 58 from its aligned position on the frame leg 14, and removing the shaft or spindle 48. The arrangement of the stop flange 72 eliminates any possibility of dislodgement of the indicator drum from its intended path of movement. Other variations and modifications of the illustrated structure are possible.

I claim:

1. A compact, shock-resistant, electric-current-responsive indicator device for connection to a D.C. circuit to be operated thereby, comprising in combination:
   (a) a U-shaped bar of substantially square cross section, constituting a frame member, said bar having a yoke portion and a pair of parallel legs extending laterally from the yoke portion, said bar having aligned shaft holes in its respective legs, spaced inward from the extremities thereof,
   (b) an indicator drum having indicia thereon, disposed between the legs of the bar with its axis aligned with the holes thereof and substantially parallel to the bar yoke,
   (c) a ring-shaped permanent magnet disposed broadside against the end of, and coaxial with said drum,
   (d) a bushing extending through and carrying said drum and magnet,
   (e) aligned bearings fitted into the ends of said bushing, and
   (f) a shaft extending through said bearings and disposed in said holes of the bar legs to support said drum and magnet for turning movement.

2. An indicator device as in claim 1, wherein:
   (a) the drum has an integral transverse end wall provided with a center opening in which the bushing is fitted, and
   (b) a spacer ring within and adjacent the other end of the drum, engaged with said bushing to support the drum thereon.

3. An indicator device as in claim 1, wherein:
   (a) one of the legs of the U-shaped bar has a plurality of mounting holes passing through it, and
   (b) means mounting said bar, comprising a structure extending alongside said one leg, and comprising pins passing through the structure and leg.

4. An indicator device as in claim 3, wherein:
   (a) the means mounting the bar comprises a mounting block extending on opposite sides of one leg of the bar,
   (b) an electromagnet having two poles extending on opposite sides of the mounting block and of the permanent magnet,
   (c) said pins securing the poles of the electromagnet to said mounting block.

5. An indicator device as in claim 6, wherein:
   (a) the mounting block comprises plastic and has a slot in which the leg of the bar is disposed,
   (b) said pins passing simultaneously through the magnet poles, mounting block and bar leg.

6. An indicator device as in claim 5, wherein:
   (a) the mounting block is L-shaped,
   (b) said electromagnet having a coil disposed in the hollow of the L-shape.

7. An indicator device as in claim 1, wherein:
   (a) the drum has an arcuate flange projecting from one end, the end-edges of said flange being engageable with one leg of the bar and constituting stops for the drum.

8. An indicator device as in claim 1, and further including:
   (a) an end stop for the shaft, disposed on one leg of the bar, said end stop comprising a pivoted strip movable to span the hole in the leg and prevent removal of the shaft through said hole.

9. An indicator device as in claim 1, wherein:
   (a) the yoke portion of said bar has an elongate opening therein, and
   (b) a lamp having an envelope with a reduced tip portion, disposed in said opening, for illuminating portions of said drum, and
   (c) means engageable with the tip of the lamp envelope and carried by said yoke portion, for steadying the lamp.

References Cited

UNITED STATES PATENTS

| | | | |
|---|---|---|---|
| RE. 26,349 | 2/1968 | Jackman | 335—222X |
| 2,988,738 | 6/1961 | Baker | 340—373X |
| 3,311,859 | 3/1967 | Bieger et al. | 340—373X |
| 2,413,381 | 12/1946 | Rylsky | 240—2.1 |

ALFRED E. SMITH, Primary Examiner

U.S. Cl. X.R.

340—373